(No Model.)  3 Sheets—Sheet 1.

J. W. SHORE.
PLANTER.

No. 551,235. Patented Dec. 10, 1895.

WITNESSES:
Chas. Nida.
J. Fred Acker

INVENTOR
J. W. Shore
BY
Munn & Co.
ATTORNEYS.

(No Model.) J. W. SHORE. 3 Sheets—Sheet 2.
PLANTER.

No. 551,235. Patented Dec. 10, 1895.

WITNESSES:
Chas. Nida
J. Fred. Acker

INVENTOR
J. W. Shore
BY Munn & Co.
ATTORNEYS.

(No Model.) 3 Sheets—Sheet 3.
J. W. SHORE.
PLANTER.
No. 551,235. Patented Dec. 10, 1895.
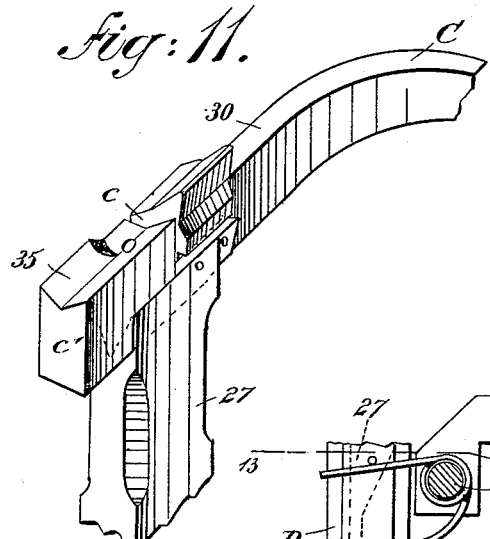
Fig. 11.
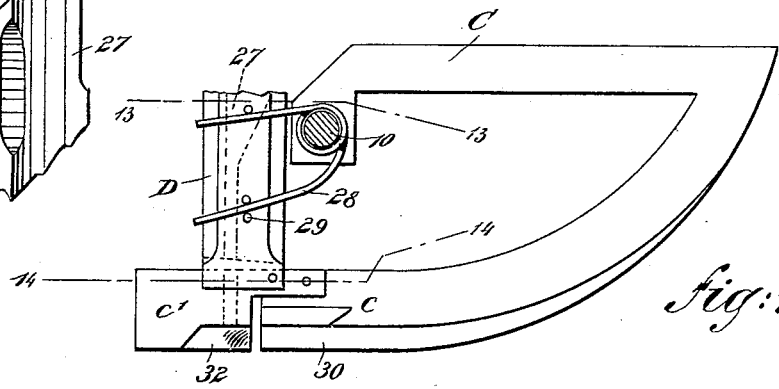
Fig. 12.
Fig. 15.
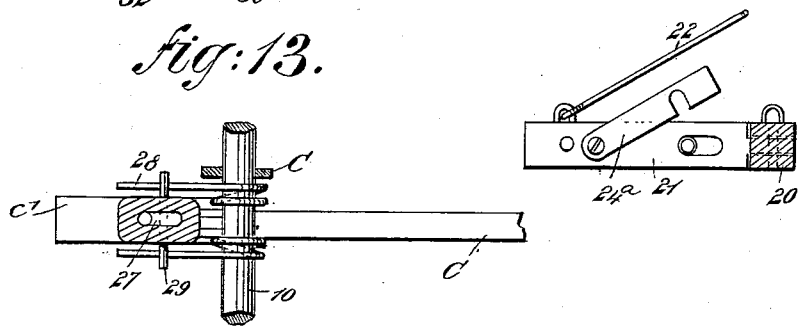
Fig. 13.
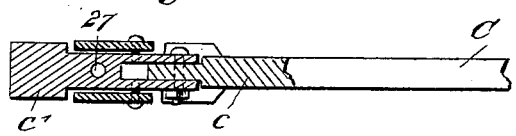
Fig. 14.
WITNESSES:
Chas. Niola
J. B. Owens
INVENTOR
J. W. Shore
BY
Munn & Co
ATTORNEYS.

UNITED STATES PATENT OFFICE.

JOHN W. SHORE, OF ANGOLA, INDIANA.

PLANTER.

SPECIFICATION forming part of Letters Patent No. 551,235, dated December 10, 1895.

Application filed March 27, 1895. Serial No. 543,401. (No model.)

*To all whom it may concern:*

Be it known that I, JOHN W. SHORE, of Angola, in the county of Steuben and State of Indiana, have invented a new and Improved Planter, of which the following is a full, clear, and exact description.

My invention relates to an improvement in planters, and it has for its object to construct a planter that will plant uniformly with regard to distance and the number of seeds or grains, one or more in a given place, or whereby two kinds of seed may be planted alternately, and also to so construct the seed dropslide that the seed-receiving opening therein will be of such form as to contain but a single seed, and to insure said seed being delivered to the chute adapted to conduct it to the ground, the same chute being employed to receive both the large and the small seed.

A further object of this invention is to provide a shoe adapted to carry the said chute and so constructed as to entirely create the furrow and cover the seed, and likewise permit of the vertical adjustment of the chute.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
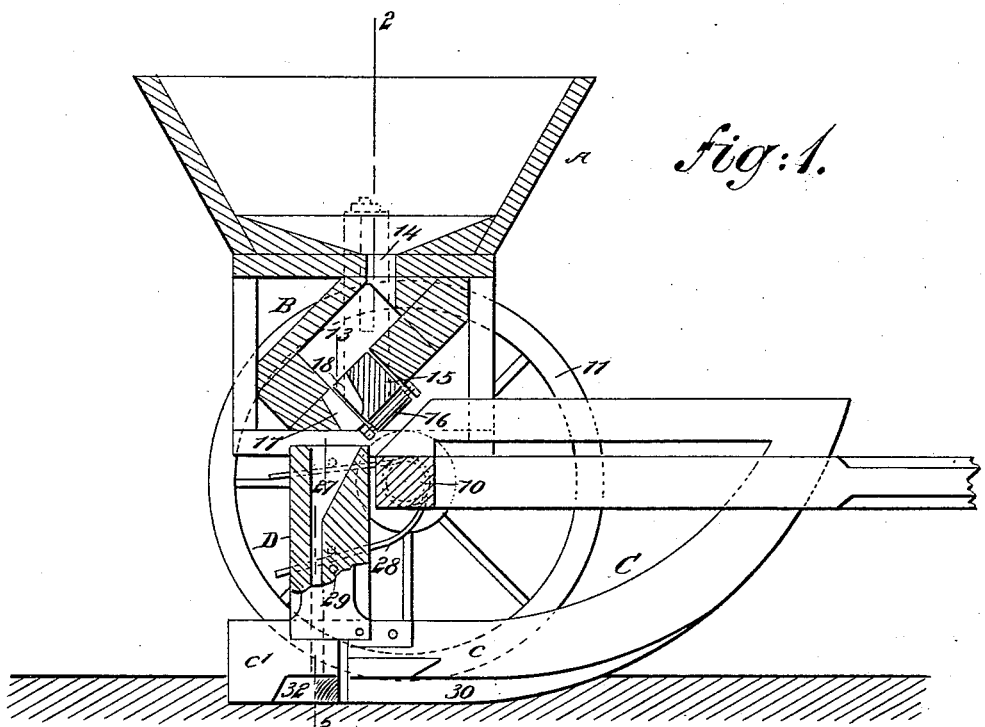
Figure 2:
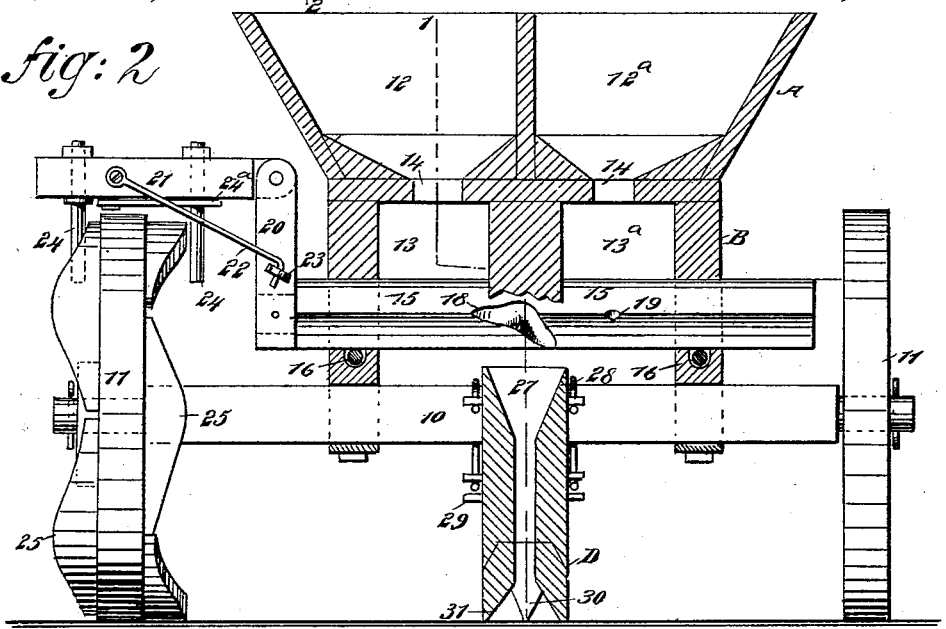
Figure 3:
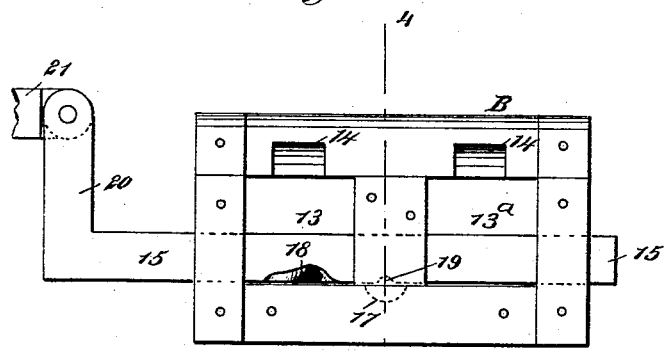
Figure 4:
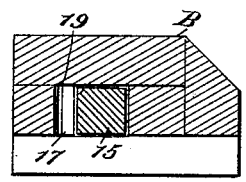
Figure 5:
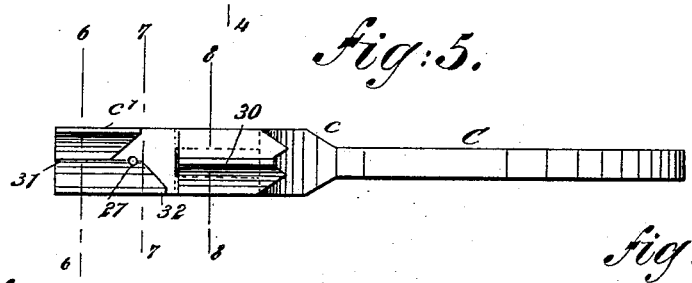
Figure 6:
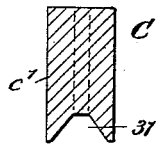
Figure 7:
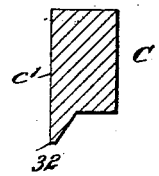
Figure 8:
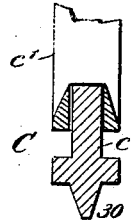
Figure 9:
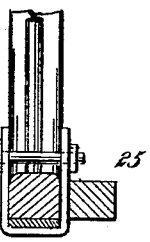
Figure 10:
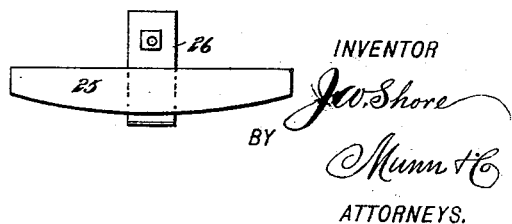

Figure 1 is a vertical section taken longitudinally through the machine and substantially on the line 1 1 of Fig. 2, and Fig. 2 is a transverse section taken substantially on the line 2 2 of Fig. 1. Fig. 3 is a detail plan view of the seed-chest in which the drop-slide operates. Fig. 4 is a transverse section through the said seed-chest, taken substantially on the line 4 4 of Fig. 3. Fig. 5 is a bottom plan view of the shoe. Fig. 6 is a transverse section through the shoe, taken substantially on the line 6 6 of Fig. 5. Fig. 7 is a similar section through the shoe, taken substantially on the line 7 7 of Fig. 5. Fig. 8 is a like section on the line 8 8 of Fig. 5. Fig. 9 is a transverse section through the tire of the ground-wheel, showing its adaptation as a driving-wheel for the drop-slide; and Fig. 10 is a side elevation of the cam to be secured to the driving ground-wheel. Fig. 11 is a perspective view of the under side of one of the shoes, illustrating in particular the construction of the pivoted parts. Fig. 12 is a side elevation of the same portion of my invention. Fig. 13 is a sectional detail taken on the line 13 13 of Fig. 12. Fig. 14 is a similar view taken on the line 14 14 of Fig. 12; and Fig. 15 is a bottom plan of the arm for communicating motion to the dropping-slide, said view illustrating in particular the latch for holding one of the pins in place.

In carrying out the invention the axle 10 of the machine is provided with two groundwheels 11 loosely mounted thereon. The hopper A and the seed-chest B are supported on the axle about centrally between the ground-wheels. The hopper A is above the seed-chest B, and the said hopper may be divided into any number of compartments. In the drawings, Fig. 2, it is illustrated as being in two compartments 12 and $12^a$, and the seed-chest B is likewise provided with two corresponding compartments 13 and $13^a$, the passages between the hopper and the chest compartments being designated as 14.

The seed-chest B is given a downward and rearward inclination, and in the bottom thereof a seed drop-slide 15 is held to laterally reciprocate, being mounted to travel on friction-rollers 16 placed in the side supports of the said seed-chest, as shown in both Figs. 1 and 2. Preferably an outlet-opening 17 is made in the bottom of the seed-chest B at its lower end, and about centrally between the two chambers or compartments 13 and $13^a$; and the said drop-slide is provided with two pockets 18 and 19, one of them being quite small and adapted to take seed from the chest-compartment in which the small seeds are placed, and the other pocket 18 is quite large and is of peculiar shape, being of a length equivalent to the full length of large grain, and this large pocket is tapering in form and disposed diagonally in the slide 15. The large pocket 18 will receive but a single large seed, and by reason of its peculiar construction will cause the seed to travel down quickly and in proper position to make its exit at the delivery-opening 17 of the chest.

At one movement of the seed drop-slide a large seed will be carried to the delivery-opening 17 of the chest, and at the next movement of the drop-slide the small pocket will register with the said delivery-opening, as shown in Fig. 3, the large pocket being shown in delivery position in Figs. 1 and 2.

The seed drop-slide is operated from one of the ground-wheels, preferably the left-hand one, and to that end the left-hand extremity of the drop-slide is provided with an upwardly-extending standard 20 fixed thereto, and an outwardly-extending horizontal arm 21 is pivoted to the top of the standard, the arm being held in a horizontal position by means of a hook 22 or its equivalent, attached to the arm and entering an eye or staple 23 secured upon the standard. The arm 21 is provided with two downwardly-extending pins 24, one being at each side of the aforesaid left-hand ground-wheel; and these pins are adapted to be engaged by cams 25 arranged in serpentine or zigzag order at both sides of the wheel. Thus as the wheel revolves, the cams being so placed that the concaved surface of the cams at one side will be opposed to the convexed surface of the cam at the opposite side, the arm 21 will receive lateral reciprocation, and it is evident will impart the same motion to the seed drop-slide.

The cams 25 may be screwed or otherwise securely fastened to opposite side faces of the felly of the wheel, or, as shown in Figs. 9 and 10, they may be made removable, in which event each cam will be provided with a clip 26, adapted to span or straddle the periphery of the wheel. Under this latter construction large or small or long or short cams may be placed upon the wheel, and the movement of the seed drop-slide rendered slow or quick, as occasion may demand.

The shoe C is pivoted at its upper rear end upon the axle 10, and the said shoe is made to curve downwardly and rearwardly in the ordinary way; but at the rear the shoe is made in two sections, a main or forward section $c$ and a rear section $c'$, the said rear section being pivoted to the front section, one section being recessed to receive the other. The chute D adapted to conduct the seed to the ground is secured upon the upper portion of the rear or pivotal section $c'$ of the shoe, and this chute is provided with a channel 27, which extends its full length and is made flaring at the top, and is continued downward through the rear pivotal section of the shoe. The upper end of the channel 27 is placed directly beneath the delivery-opening 17 in the seed-chest, receiving the seed therefrom, and the chute, together with the rear pivotal section of the shoe, is capable of raising upon striking an obstruction, springs 28 being coiled around the axle and having their ends carried to an engagement with pins 29 upon opposite sides of the chute, whereby this movement is assisted and made easy. The springs also operate to hold the shoe in yielding contact with the ground.

As shown in the cross-section, Fig. 8, the lower portion of the main section $c$ of the shoe is provided with a central wedge-shaped rib 30, adapted to make the furrow for the reception of the seed. The extreme rear portion of the heel-section $c'$ of the said shoe is provided in its bottom surface with a V-groove 31, but the forward bottom portion of this heel-section, as shown in Figs. 1, 5, and 7, is cut away at one side to form at the left-hand side, for example, a single side rib 32, and the outlet of the channel 27 is located near this single covering-rib. Under this construction as the machine advances the furrow is made, and the earth is turned in the furrow at one side simultaneously with the seed being deposited in the furrow, and the seed is completely covered and the earth ridged up over it by the V-grooved portion 31 of the heel-section of the shoe.

As the arm 21 receiving motion from the cam of the ground-wheel is pivoted to the standard 20, it is evident that by raising the said arm the operation of the seed drop-slide may be instantly stopped, and that the cams 25 shown are really blocks or sections intended to produce when properly placed a continuous serpentine cam.

I desire it to be understood that the manner in which the shoe C is attached to the frame of the planter, or the manner in which the shoe is raised or lowered, is immaterial, since the construction necessary may be varied from that shown in the drawings without departing from the spirit of the invention.

The inner pin 24 in the drop-slide arm 21 is passed through a wide opening in order that said pin will drop back to clear the cam 25 when the arm is lifted, being held in position to engage with the cam by a latch $24^a$.

Having thus described my invention, I claim as new and desire to secure by Letters Patent—

1. In a planter, a seed drop slide provided with a seed receiving pocket tapering from its upper to its lower end and disposed diagonally in the slide, substantially as and for the purpose specified.

2. In a planter, the combination, with a furrow opening and seed-conducting chute, of a seed chest divided into compartments for large and small seed, the said chest being provided with an outlet for the seed over the seed receiving chute, and a drop slide held to slide in the chest, provided with a small pocket to receive the small seed and a diagonally located tapering pocket to receive the large seed, both pockets being capable of registry with the delivery opening in the chest, as and for the purpose specified.

3. In a planter, a shoe pivoted at its upper rear end heel section, pivoted to the lower rear end of the shoe and a spring-pressed seed delivery chute mounted on the said heel section, as and for the purpose specified.

4. In a seed planter, a shoe pivoted at its upper rear end and provided at its lower portion, or at that portion which engages the ground, with a central longitudinal furrow opening rib, the rear end of the shoe having pivoted thereto a heel, and the said heel being provided at its under side with an offset rib and with a V-shaped groove rearward of said rib, substantially as described.

5. In a seed planter, a shoe pivoted at its upper rear end and provided at its lower portion, or at that point which engages the ground, with a central longitudinal and furrow opening rib, a heel pivoted to the rear end of the shoe and having at its front portion an offset rib and having directly rearward of said offset rib a V-shaped groove, a perpendicular seed chute pivotally mounted on the heel, and a spring bearing upon the seed chute and holding it yieldingly in position, substantially as described.

6. In a planter, the combination, with a ground wheel, of a series of cam blocks adapted to be arranged at opposite sides of the wheel to form a continuous serpentine cam, each cam block being provided with a U-shaped clip to one side of which the respective blocks are secured, the clips being capable of embracing the wheel felly whereby the blocks are removably secured to the wheel, as and for the purpose specified.

7. In a seed planter, the combination with the frame and seed box, of a drop slide, a standard secured to one end of the same and arising vertically therefrom, a horizontally extended arm pivotally mounted to the upper end of the standard, means for holding the arm rigidly in a horizontal position, a revolving cam wheel over which the arm projects, two downwardly-extending pins fixed to the arm and engaging with the cam wheel whereby the arm and drop slide are reciprocated, the inner of said pins being located in a slot elongated longitudinally with the arm, and a latch hinged to the under side of the arm and provided at its free end with a slot capable of receiving the pin whereby the pin is removably held in a portion of its enlarged slot, substantially as described.

JOHN W. SHORE.

Witnesses:
   EUGENE A. CARVER,
   ISAAC E. BRANDEBERRY.